US008366147B2

(12) United States Patent
Singer et al.

(10) Patent No.: US 8,366,147 B2
(45) Date of Patent: Feb. 5, 2013

(54) INFLATABLE SAFETY BELT

(75) Inventors: Klaus-Peter Singer, Hamburg (DE);
Jens Roos, Hamburg (DE); Oliver Meier, Hamburg (DE); Barbara Hantel, Elmshorn (DE); Uwe Evers, Glückstandt (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/127,252

(22) PCT Filed: Oct. 27, 2009

(86) PCT No.: PCT/EP2009/007663
§ 371 (c)(1),
(2), (4) Date: May 26, 2011

(87) PCT Pub. No.: WO2010/051924
PCT Pub. Date: May 14, 2010

(65) Prior Publication Data
US 2011/0215558 A1 Sep. 8, 2011

(30) Foreign Application Priority Data

Nov. 4, 2008 (DE) .......................... 10 2008 055 769

(51) Int. Cl.
*B60R 21/18* (2006.01)
(52) U.S. Cl. ....................................................... 280/733

(58) Field of Classification Search .................. 280/733, 280/801.1, 808; 297/468, 482, 483
See application file for complete search history.

(56) References Cited

U.S. PATENT DOCUMENTS

| 5,474,326 | A  | * | 12/1995 | Cho ............................... 280/733 |
| 6,293,626 | B1 | * | 9/2001 | Nariyasu ........................ 297/472 |
| 7,748,735 | B2 | * | 7/2010 | Itoga ............................. 280/733 |
| 7,874,581 | B2 | * | 1/2011 | Itoga ............................. 280/733 |
| 8,016,362 | B2 | * | 9/2011 | Itoga ............................. 297/471 |
| 2010/0123301 | A1 | * | 5/2010 | Thomas ......................... 280/733 |

FOREIGN PATENT DOCUMENTS

| EP | 0 652 140 A1 | 11/1993 |
| EP | 0 908 358 A | 4/1999 |
| EP | 1 273 487 A | 1/2003 |
| GB | 2328185 A | 8/1997 |
| JP | 11 268608 A | 10/1999 |
| WO | WO 2006/105905 A1 | 10/2006 |

* cited by examiner

*Primary Examiner* — Paul N Dickson
*Assistant Examiner* — Robert A Coker
(74) *Attorney, Agent, or Firm* — Brinks Hofer Gilson & Lione

(57) ABSTRACT

An inflatable safety belt has a belt webbing (3) with at least two belt webbing layers (3a, 3b) put on top of each other and forming a hollow space in between, a gas generator (12) having a flow connection to the hollow space, and an anchor fitting (6) for fastening the belt webbing (3) and the gas generator (12) to a motor vehicle. The ends of the belt webbing layers (3a, 3b) are connected to the anchor fitting (6) in such a way that the flow connection to the gas generator (12) is free of tensile forces.

12 Claims, 7 Drawing Sheets

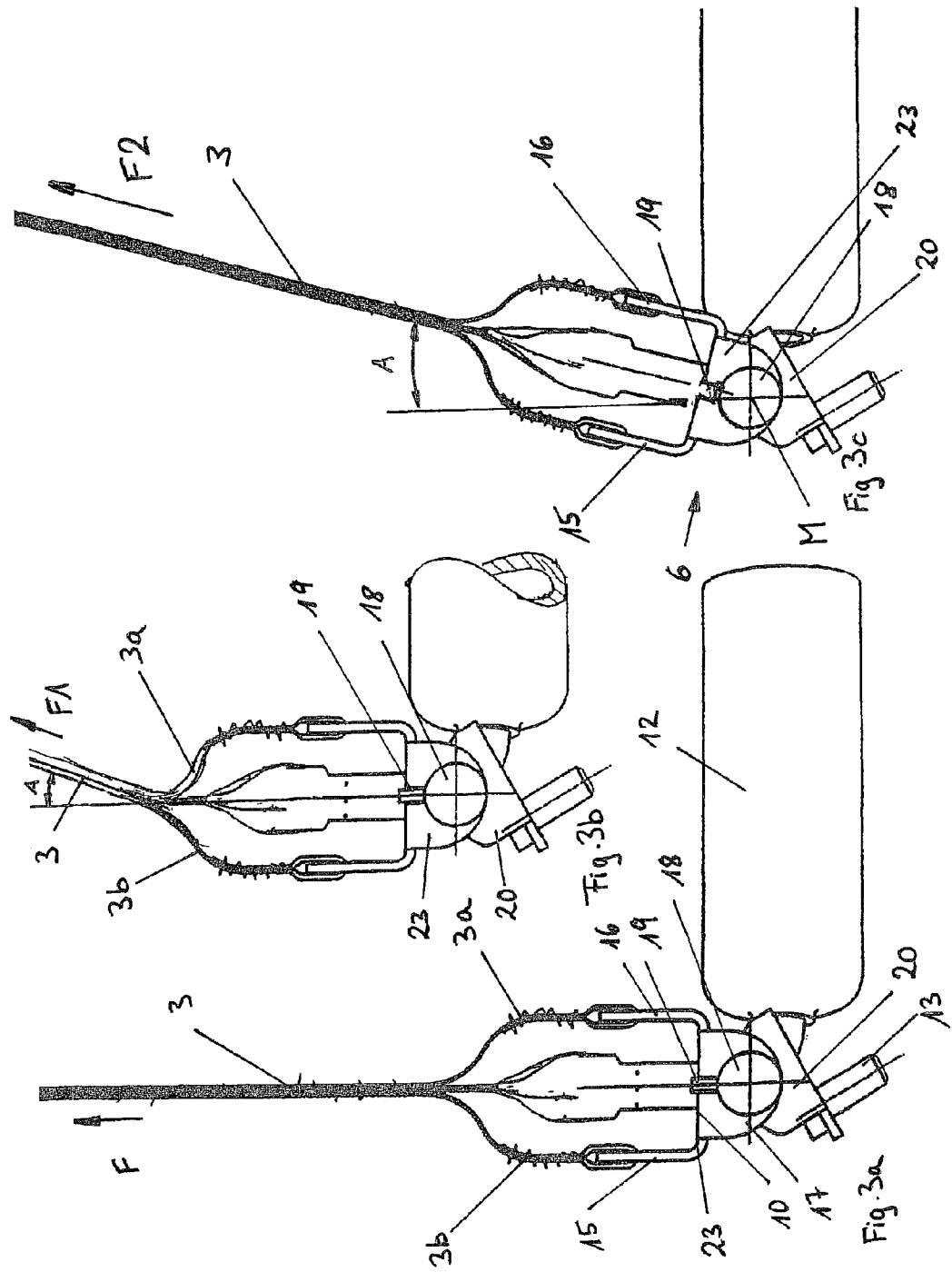

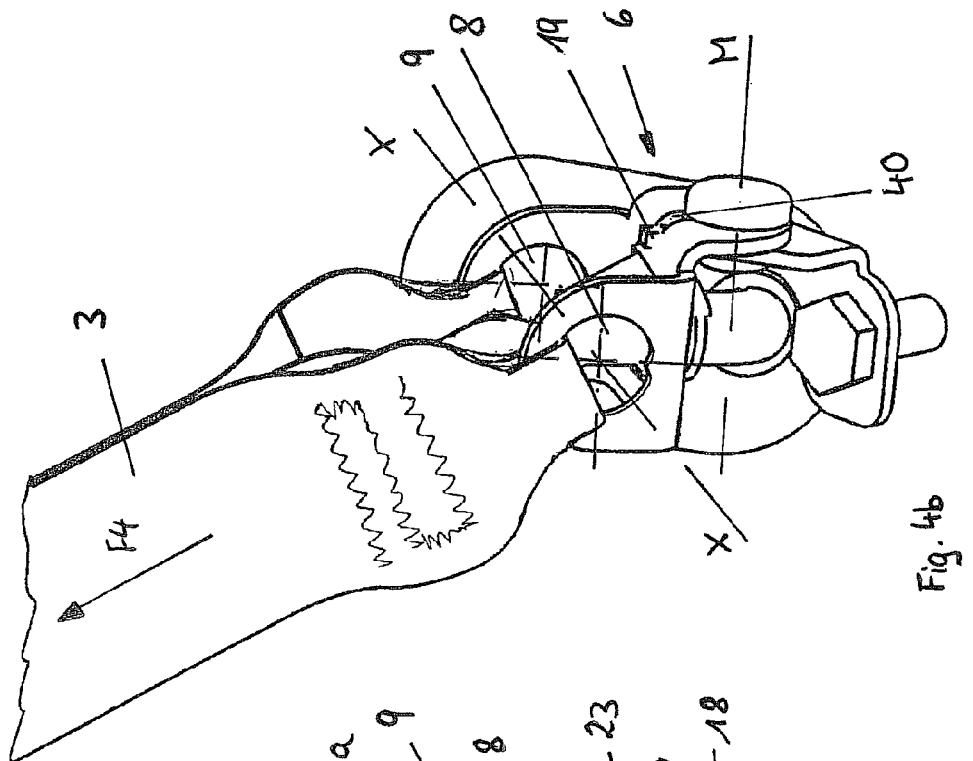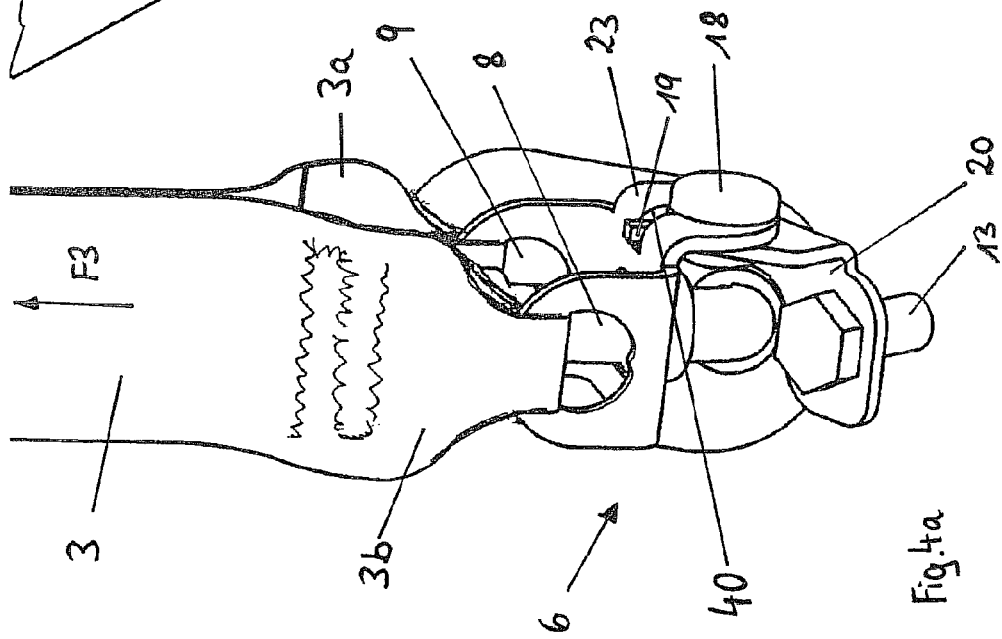

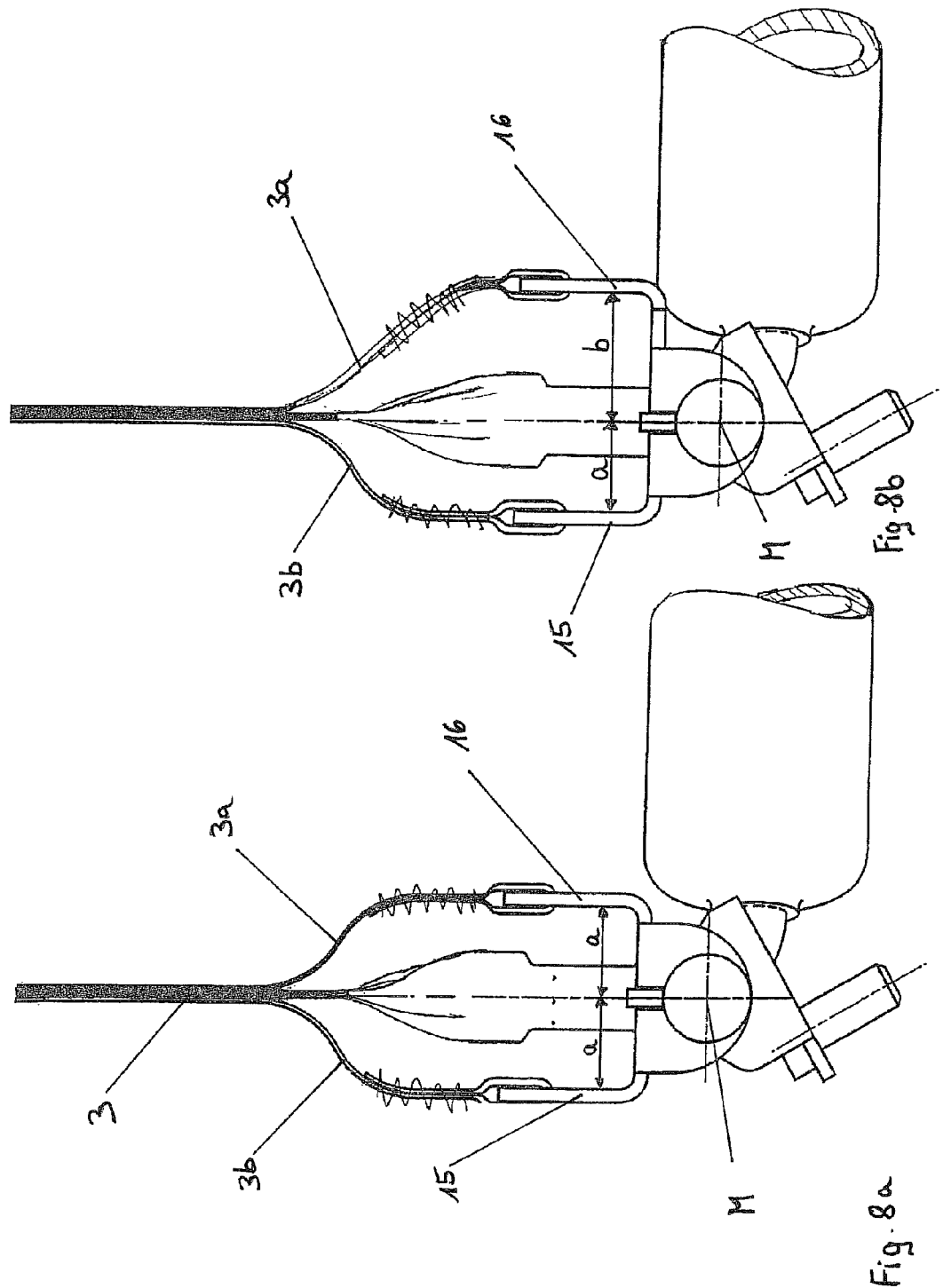

INFLATABLE SAFETY BELT

CROSS REFERENCE TO RELATED APPLICATION

This application claims priority to German Patent Application No. 10 2008 055 769.2, filed Nov. 4, 2008, and International Patent Application No. PCT/EP2009/007663, filed Oct. 27, 2009.

TECHNICAL FIELD

The invention relates to an inflatable safety belt with a belt webbing that has at least two belt webbing layers on top of each other and forming a hollow space in between, a gas generator with a flow connection to the hollow space, and an anchor fitting for fastening the belt webbing and the gas generator to a motor vehicle.

BACKGROUND OF THE INVENTION

Besides their actual function to restrain the passenger during an accident and to thereby couple the same to the vehicle deceleration, inflatable safety belts in addition have the characteristic of being inflatable during an accident so that the passenger load is reduced. An important problem about inflatable belts to be solved is the arrangement of the gas generator and the filling of the inflatable safety belt with the gas flow generated by the gas generator.

From WO 2006/105905 A1, an inflatable safety belt is already known, in which the gas generator is located at the end fitting, and the end fitting is formed in such a manner that by means of the same the filling pipe of the gas generator can be sealed as well as the tensile force can be transmitted from the safety belt to the vehicle structure. A disadvantage in this solution is that in the event of failure of either the fastening of the safety belt or the connection to the gas generator, the respective other function runs the risk of also being adversely affected. Furthermore, there is the general problem that, when designing the fastening of the safety belt, attention always is also to be paid to the sealing of the filling pipe and vice versa so that neither the fastening of the safety belt nor the sealing of the filling pipe can per se be designed in an optimal manner.

SUMMARY OF THE INVENTION

Based on this prior art, it is an object of the invention to provide an inflatable safety belt with a fastening to a motor vehicle, which safety belt can be designed in an optimal manner with regard to the required restraining forces as well as with regard to the filling.

The solution of the object is achieved according to the invention by an inflatable safety belt comprising that the ends of the belt webbing layers are connected to the anchor fitting in such a way that the flow connection to the gas generator is free of tensile forces. Hereby, the belt webbing and the gas generator are located functionally separate at the anchor fitting, as the tensile forces are not transmitted from the safety belt to the anchor fitting via the connection of the gas generator, of the filling pipe or of another part of the flow connection between the gas generator and the inflatable belt. Thereby, the flow connection to the gas generator is free of tensile forces with regard to the tensile forces from the belt webbing so that this connection is not loaded by the tensile forces exerted by the belt webbing during the accident. Thus, the flow connection can be designed in an optimal manner with regard to impermeability, to flow guidance and to the loads acting when the belt is inflated, etc. Furthermore, the connection between the ends of the belt webbing layers and the anchor fitting can be dimensioned with regard to its type and dimensioning solely according to the loads resulting from the tensile forces. The invention thereby provides an inflatable safety belt having the tremendous advantage for the restraint of the passenger that the inflatable safety belt, even in the event of failure of the gas generator or its connection to the inflatable safety belt, just still operates as a conventional non-inflatable safety belt.

A particularly simple configuration of the anchor fitting and of the arrangement of the belt webbing layers and of the gas generator is realized by the ends of the belt webbing layers being mounted separate on two spaced brackets of the anchor fitting and by the gas flow generated by the gas generator being introduced into the belt webbing between the ends. By the separate connection of the belt webbing layers, a gain in safety is achieved, as, in the event of failure of the connection of one of the belt webbing layers to the anchor fitting, a restraint function is still provided by the respective other belt webbing layer.

It is further proposed that the anchor fitting comprises a base plate, that the brackets project on two sides of the base plate in such an angled manner that the base plate and the brackets form a U-shaped cross-section, and that the gas generator is connected to the base plate. By the U-shape of the anchor fitting provided in the area of connection of the belt webbing layers, the belt webbing layers are kept at a distance, wherein in the space provided between the brackets, the gas can be introduced and the components required therefor, like gas lance, diffuser etc., can be arranged.

Furthermore, the anchor fitting can be formed from at least two fitting parts swivel-mounted on each other, wherein, in this case, the belt webbing layers are fastened to one of the fitting parts, and the other fitting part is fastened to the motor vehicle. Thereby, the fitting part, to which the belt webbing layers are fastened, can align itself in relation to the fitting part fastened to the motor vehicle upon a diagonal pull of the belt webbing so that the angle of the diagonal pull can be compensated and the tensile forces can be transmitted to the fitting part in accordance with the predetermined alignment.

It is further proposed that the ends of the belt webbing layers are swivel-mounted in openings provided at the anchor fitting, and that the swivel axis of the swivel motion effected by the fastening in the openings and the swivel axis of the swivel motion between the fitting parts are arranged at an angle, preferably at a right angle towards each other. Thus, the belt webbing layers can align themselves at the anchor fitting around two swivel axes for example around one axis perpendicular to the driving direction and one axis parallel to the driving direction so that different belt engagement angles caused by different passengers or different positions of the seat can be taken into account, and the diagonal pull caused thereby is avoided.

In this case, in order to fix the rotational position of the fitting parts towards each other, an engagement means engaging with a recess of the other fitting part can be provided on one fitting part, wherein the connection of the fitting parts produced by the engagement means can be disconnected in the event that a breakaway force predetermined by the engagement means is exceeded. Thus, during normal use, the anchor fitting always has a predetermined alignment which cannot be changed until the breakaway force caused by the tensile force in the safety belt is exceeded during an accident.

It is further proposed that a gas lance is provided between the belt webbing layers, that the gas lance has a flow-related connection to the gas generator via a diffuser, and that the diffuser is secured at the anchor fitting in the longitudinal direction. By securing the diffuser in the longitudinal direction at the anchor fitting, the forces produced during the gas expansion are transmitted to the anchor fitting in the longitudinal direction so that at least one of the gas generator and the gas lance are not loaded in the longitudinal direction.

A simple cost-effective way of connecting the belt webbing layers to the anchor fitting is to put the ends of the belt webbing layers on top of each other in several layers in a self-locking manner in order to be fastened. Thus, additional cost-incurring connections like sewing, welding, bonding etc. are omitted.

The connection can alternatively or additionally be further improved by the belt webbing layers winding around one or more clamping elements. The use of the clamping elements increases the stability of the connection by the clamping element providing a form-closed connection to the anchor fitting.

In this case, it is further proposed that the clamping element is formed by a pin, which, wound around by the belt webbing layer or the belt webbing layers, forms a thickening and is located in the course of the belt webbing layer in front of a narrow point assigned to the anchor fitting.

The clamping element can alternatively or additionally be secured in a rotationally fixed manner by its outer geometry in a counter contour of the anchor fitting, whereby the fastening of the belt webbing layers is further improved.

A further preferred embodiment of the invention is that the ends of the belt webbing layers are mounted on the anchor fitting at a different distance to the belt webbing, to at least one of the center of the diffuser and the swivel axis of the fitting parts towards each other. Thereby, the load transmitted to the anchor fitting can individually be distributed to the single belt webbing layers, if desired.

In the following, the invention is described in more detail on the basis of several preferred embodiments.

BRIEF DESCRIPTION OF THE DRAWINGS

In the figures,
FIG. 3a-3c: shows an inflation unit with an anchor fitting comprising two fitting parts formed in a swiveling manner towards each other with different belt tensile forces from different angles;
FIGS. 4a-4b: shows an inflation unit with an anchor fitting comprising openings in which the ends of the belt webbing layers are mounted;
FIGS. 8a-8b: shows an inflation unit with an anchor fitting comprising two brackets with a different distance to the belt webbing.

DETAILED DESCRIPTION OF THE DRAWINGS

Figure 1:
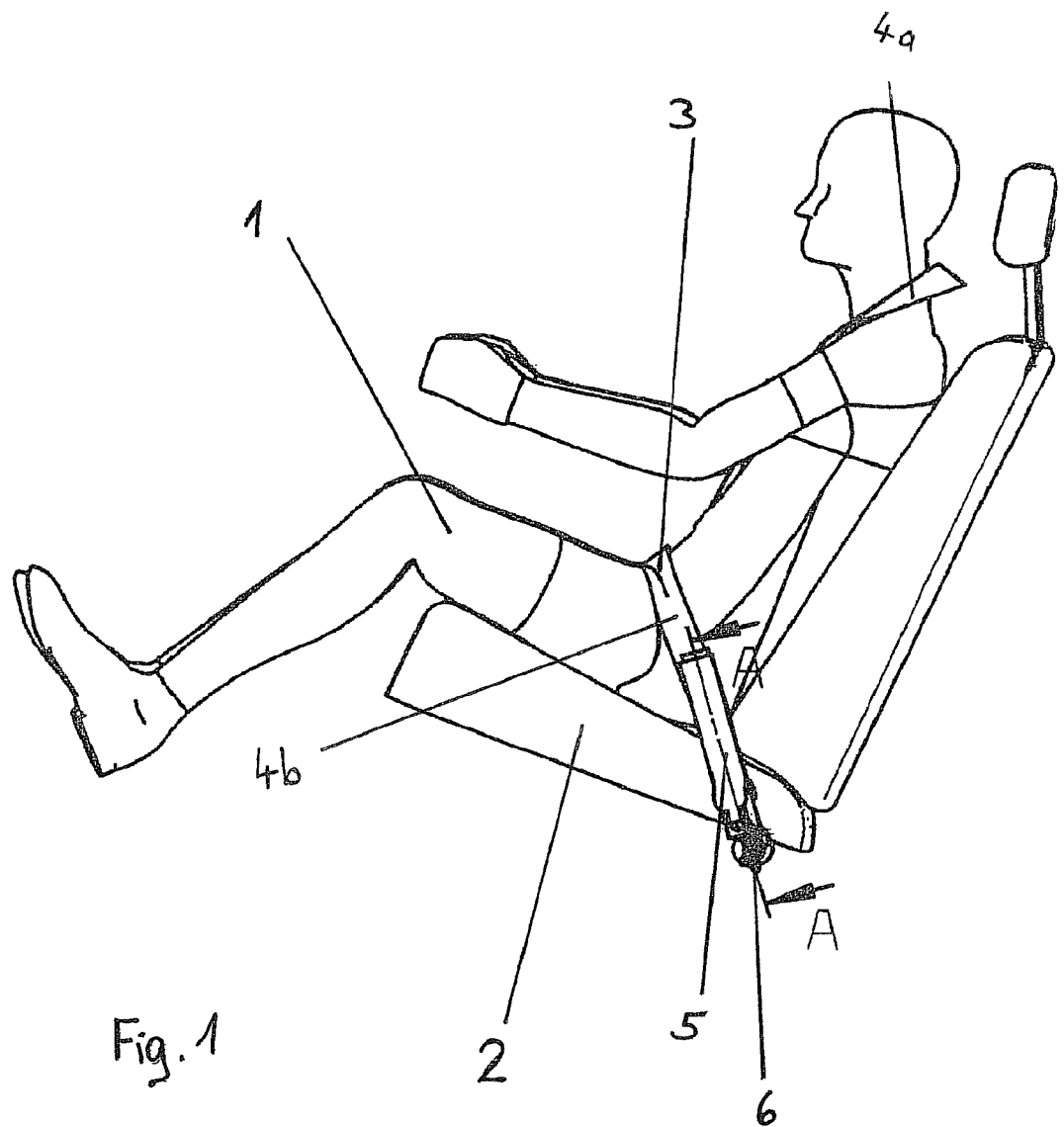
FIG. 1: shows a passenger with an inflatable safety belt.

FIG. 1 is an exemplary representation of a passenger 1 on a vehicle seat 2 of a motor vehicle not shown. The passenger 1 is secured via an inflatable safety belt with a belt webbing 3 which is divided into a diagonal belt 4a running from the motor vehicle over the shoulder diagonally across the chest of the passenger 1 to a belt buckle not shown and a lap belt 4b running from the belt buckle over the lap of the passenger 1 to an anchor fitting 6. At the end of the lap belt 4b connected to the motor vehicle via the anchor fitting 6 an inflation unit 5 is provided, via which the inflatable safety belt can be inflated at least in sections.

Figure 2:
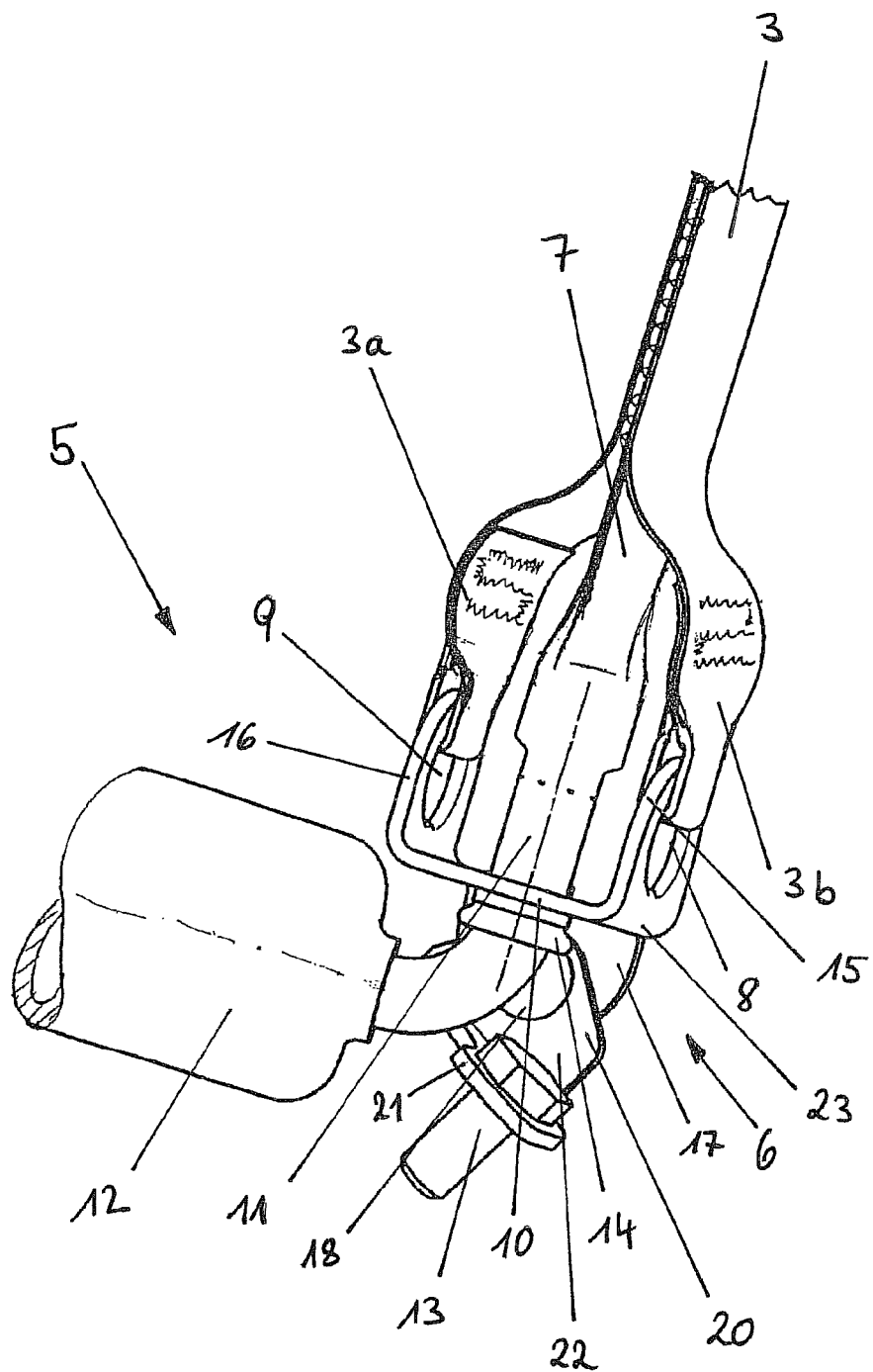
FIG. 2: shows an inflation unit with an anchor fitting.

FIG. 2 shows the inflation unit 5 with the anchor fitting 6 in a cut-out. The belt webbing 3 is at least in the area of the lap belt 4b and in part of the diagonal belt 4a formed from two belt webbing layers 3a and 3b, which are put on top of each other and which are connected to each other preferably at the borders forming a hollow space located between the belt webbing layers 3a and 3b. A gas lance 7 is located in the hollow space between the belt webbing layers 3a and 3b, by which gas lance the gas flow is distributed in the inflatable safety belt. The belt webbing layers 3a and 3b themselves have a substantially bigger surface and are folded to a belt webbing 3 having a conventional flat webbing form. When the belt webbing 3 is inflated, the belt webbing layers 3a and 3b are separated from each other and recapture their original form. In doing so, the hollow space and the outer surface considerably increase, the belt webbing 3 virtually is inflated to a thick "roll". By the inflated safety belt, the passenger load is reduced, as the surface of the safety belt resting against the passenger is substantially increased, and, thereby, the surface load is reduced at an equal force.

The anchor fitting 6 is formed from two fitting parts 20 and 23, wherein the fitting part 20 is connected to the motor vehicle and the fitting part 23 is connected to the belt webbing 3. The fitting part 20 is provided with a mounting plate 21 projecting at an angle, in which mounting plate a fastening means 13 in the form of a screw is provided for the fastening to the motor vehicle. The fitting part 23 has a base plate 10, a bracket 17 projecting from the base plate 10 in the direction of the side facing away from the belt webbing 3 and two brackets 15 and 16 running perpendicular to the bracket 17 and projecting in the direction of the belt webbing 3. In the bracket 17, a bolt 18 is located, via which the fitting parts 20 and 23 are connected to each other in a swiveling manner. In the brackets 15 and 16 facing the belt webbing 3 and projecting from the base plate 10, openings 8 and 9, respectively, are provided, in which the belt webbing layers 3a and 3b are swivel-mounted. Laterally next to the anchor fitting 6, a gas generator 12 is provided having a flow connection to the gas lance 7 via a diffuser 11. The diffuser 11 is provided with a bulge 14, which absorbs the longitudinal forces acting upon the diffuser 11 and the gas lance 7 and transmits the same to the base plate 10 so that the diffuser 11 and the gas lance 7 do not displace during the inflation process.

FIGS. 3a-3c show the identical inflation unit from FIG. 2 according to view A-A from FIG. 1 with different belt forces from different belt engagement angles. First, FIG. 3a shows the position of the fitting parts 20 and 23, where the belt force "F" of the belt webbing 3 essentially attacks parallel to the brackets 15 and 16 so that the relative rotational position of the fitting parts 20 and 23 towards each other is identical with the predetermined rotational position. The predetermined rotational position is fixed by an engagement means 19 assigned to the fitting part 20 and engaging with a recess 40 on the fitting part 23, as can also be seen in FIGS. 4a and 4b.

FIG. 3b shows the same anchor fitting 6 with a belt force "F1" attacking at an angle "A", as it occurs for example during normal use of the safety belt. The fitting parts 20 and 23 still take the position determined by the engagement means 19.

FIG. 3c shows the same anchor fitting 6, in which the belt force "F2" now has increased to the extent that a breakaway force determined by the engagement means 19 is exceeded. By the breakaway force having been exceeded, the engagement means 19 has been irreversibly broken and the fitting part 23 is swiveled in relation to the fitting part 20 by the angle "A". The relative swivel ability of the fitting parts 20 and 23 towards each other is thereby determined by the swivel axis "M" defined by the bolt 18. Due to the fitting part 23 being swiveled in relation to the fitting part 20 the brackets 15 and 16 now again are aligned parallel to the direction of attack of the belt force "F2".

FIGS. 4a and 4b show how the belt webbing 3 aligns itself with the ends of the belt webbing layers 3a and 3b mounted in the openings 8 and 9 at belt forces "F3" and "F4" from different belt engagement directions in one plane perpendicular to the swivel axis "X" defined by the openings 8 and 9. The position of the fitting parts 20 and 23 towards each other, there, remains unchanged. Hereby, in particular different belt force attack directions caused by the differing position of the seat or different passengers are taken into account. The swivel axis "X" defined by the openings 8 and 9 and the swivel axis "M" defined by the bolt 18 are at an angle, preferably at a right angle towards each other so that in particular under load a big swivel area is produced and as many belt engagement angles as possible can be compensated and the otherwise present diagonal pull is avoided.

Figure 5:
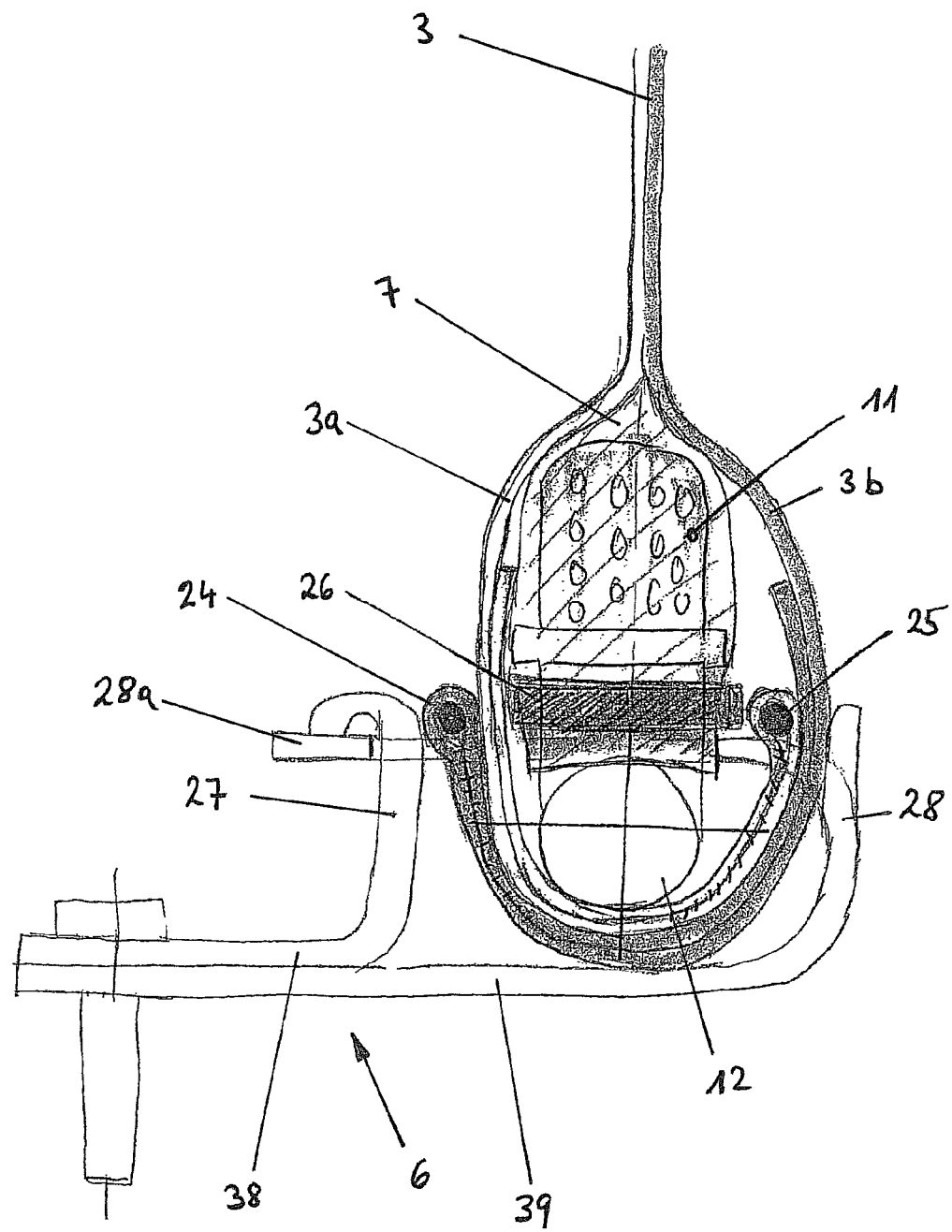
FIG. 5: shows an inflation unit with an anchor fitting and pin-shaped clamping elements, around which the ends of the belt webbing layers are wound.

FIG. 5 shows an alternative embodiment, in which the anchor fitting 6 is formed by two fitting parts 38 and 39 put on top of each other. Each of the fitting parts 38 and 39 is bent to brackets 27 and 28 at its end in the direction of the belt webbing 3, between which brackets at least one of the gas generator 12, the diffuser 11 and other parts of the flow connection are located. In the further course, the bracket 28 with its end 28a is again bent in the direction of the bracket 27 and is connected to the same in an overlapping area. The end 28a bent backwards is provided with an aperture region not shown in detail, through which aperture region the diffuser 11 passes. The diffuser 11 comprises a flange 26 resting against the end 28a bent backwards and thereby fixing the diffuser 11 in the longitudinal direction of the escape of the gas flow. The belt webbing layers 3a and 3b are wrapped around the gas generator 12 and the diffuser 11 so that the belt webbing layers 3a and 3b are fixed in a friction-locked manner. Additionally, the ends of the belt webbing layers 3a and 3b are wrapped around pin-shaped clamping elements 24 and 25 and are sewed to each other, if required. The clamping elements 24 and 25 are located in the pull direction of the belt force of the belt webbing layers 3a and 3b behind narrow points formed by the brackets 27 and 28 and the diffuser 11, and thereby effect a transmission of the tensile forces exerted by the belt webbing 3 to the anchor fitting 6. The belt webbing 3 is thereby mounted on the anchor fitting 6 in a more or less self-securing manner.

Figure 6A:
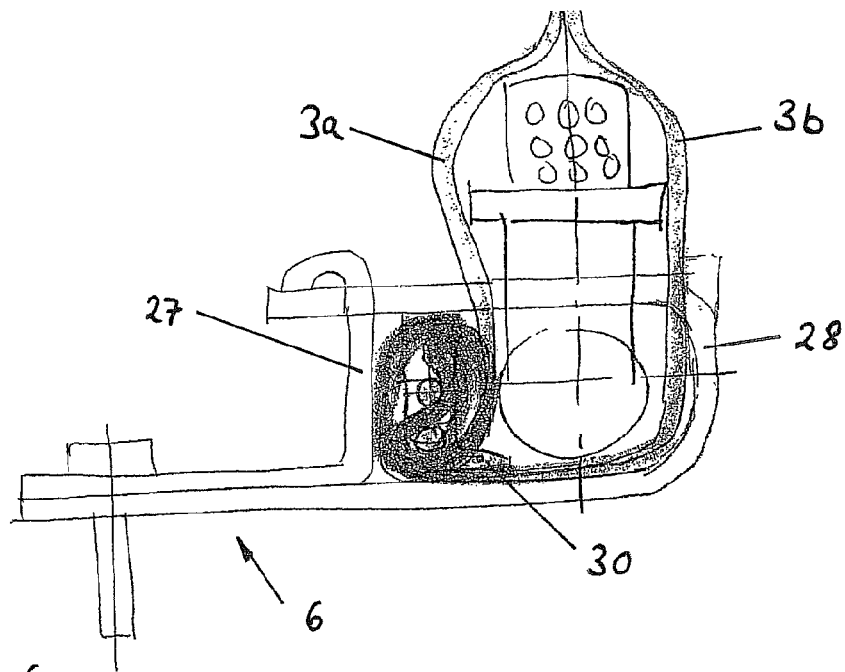
FIGS. 6a-6b: shows an inflation unit with an anchor fitting and clamping element, around which the ends of the belt webbing layers are wound, which clamping element comprises an outer contour secured in a rotationally fixed manner in a counter contour of the anchor fitting.
Figure 6B:
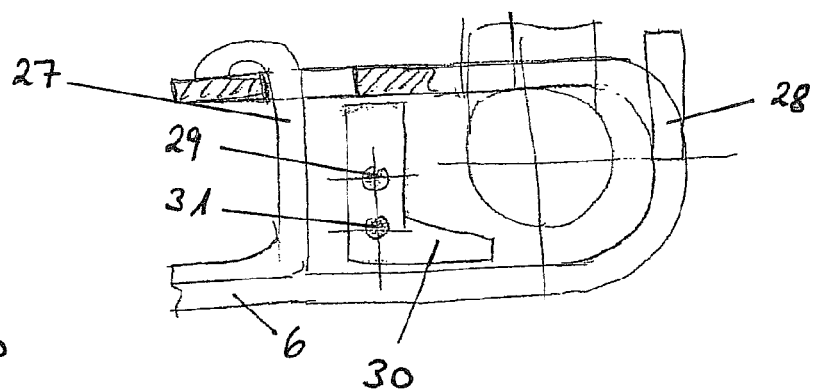
Figure 7:
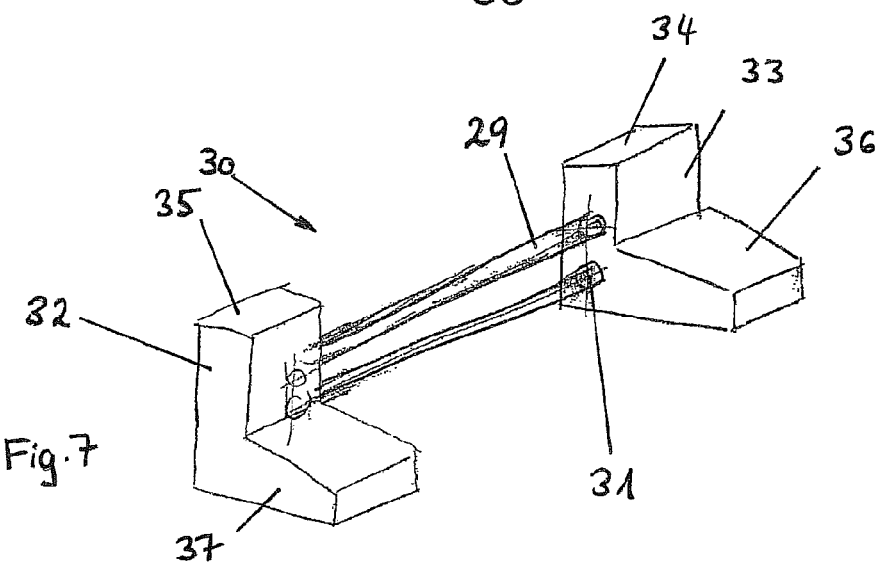
FIG. 7: shows the clamping element from FIGS. 6a-6b.

FIGS. 6a and 6b show a further alternative embodiment of the invention, in which the belt webbing layers 3a and 3b are also wrapped around the gas generator 12 and the diffuser 11 and are mounted on a joint clamping element 30. The clamping element 30 shown in FIG. 7 is formed from two wedge elements 32 and 33 connected to each other via bars 29 and 31, wherein each wedge element is formed from a base body 34 and 35 and support parts 36 and 37 projecting therefrom. As can be seen in FIG. 6a, the belt webbing layers 3a and 3b are wound around the bars 29 and 31 and are thereby mounted on the same in a friction-locked manner. Owing to the base bodies 34 and 35 and to the support parts 36 and 37 located on the same, the clamping element 30 has such an outer contour that, in the mounting position shown in FIG. 6a, it supports itself in a rotationally fixed manner on a counter contour provided by the anchor fitting 6. Furthermore, the wedge elements 32 and 33 effect a self-clamping of the clamping element 30 in the anchor fitting 6 when the belt webbing 3 exerts a tensile force.

FIGS. 8a and 8b show a further preferred embodiment of the invention, in which the distance of the brackets 15 and 16 to the pull direction of the belt webbing 3 is different. In FIG. 8a, the distance "a" of the brackets 15 and 16 is identical so that thereby the attacking belt force from the belt webbing 3 is equally distributed to both brackets 15 and 16. In the embodiment shown in FIG. 8b, the distance "a" of the bracket 15 to at least one of the belt webbing 3, the center of the swivel axis "M" and the center of the diffuser 11 is smaller than the corresponding distance "b" of the bracket 16. Thereby, the belt force transmitted by the belt webbing 3 via the belt webbing layers 3a and 3b is unequally distributed to the brackets 15 and 16. In the shown embodiment, the distance "a" is smaller than the distance "b" so that the force transmitted to the bracket 15 is greater.

The invention is not limited to the illustrated embodiment, but rather includes all means functioning identically within the meaning of the invention. The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An inflatable safety belt comprising:
    a belt webbing having at least two belt webbing layers on top of each other and forming a hollow space in between,
    a gas generator having a flow connection to the hollow space,
    an anchor fitting having one anchoring fitting part for fastening the belt webbing and the gas generator to a motor vehicle,
    further comprising that each of the two belt webbing layers has one end, both of the two ends being connected to the anchor fitting in such a way that the flow connection from the gas generator to the hollow space is free of tensile forces.

2. The inflatable safety belt according to claim 1, further comprising that the ends of the belt webbing layers are mounted separate on two spaced brackets of the anchor fitting, and that a gas flow generated by the gas generator is introduced into the hollow space between the ends.

3. The inflatable safety belt according to claim 2, further comprising
    that the anchor fitting has a base plate,
    that the brackets project on two sides of the base plate, the base plate and the brackets forming a U-shaped cross-section,
    and that the gas generator is connected to the base plate.

4. The inflatable safety belt according to claim 1, further comprising that
a gas lance is arranged between the belt webbing layers,
that the gas lance has a flow-related connection to the gas generator via a diffuser, and that the diffuser is secured at the anchor fitting in the longitudinal direction.

5. The inflatable safety belt according to claim 1, further comprising that
the ends of the belt webbing layers are fastened by arranging the ends on top of each other in a self-locking manner.

6. The inflatable safety belt according to claim 1, further comprising that
the belt webbing layers wind around at least one clamping element.

7. The inflatable safety belt according to claim 6, further comprising that the at least one clamping element secures itself in a non-rotatable manner by its outer geometry in a counter contour of the anchor fitting.

8. An inflatable safety belt comprising:
a belt webbing having at least two belt webbing layers on top of each other and forming a hollow space in between,
a gas generator having a flow connection to the hollow space,
an anchor fitting for fastening the belt webbing and the gas generator to a motor vehicle, further comprising that the belt webbing layers have ends that are connected to the anchor fitting in such a way that the flow connection from the gas generator to the hollow space is free of tensile forces,
further comprising that the anchor fitting is formed from at least two fitting parts swivel-mounted on each other and swivelable relative to each other about a horizontal swivel axis,
that the belt webbing is fastened to one of the fitting parts, and that the other fitting part is fastened to the motor vehicle.

9. The inflatable safety belt according to claim 8, further comprising that the ends of the belt webbing layers are swivel-mounted in openings provided at the anchor fitting, and that a swivel motion of the belt webbing layers with respect to the anchor fitting defines a first swivel axis and the horizontal swivel axis of the two fitting parts is a second swivel axis, the first and second swivel axes being substantially perpendicular towards each other.

10. The inflatable safety belt according to claim 9, further comprising that the ends of the belt webbing layers are fastened on the anchor fitting at a different distance to at least one member of the group consisting of the belt webbing, a center of a diffuser, and the swivel axis of the fitting parts towards each other.

11. The inflatable safety belt according to claim 8, further comprising an engagement means fixing a rotational position of the fitting parts towards each other, the engagement means being arranged on one of the fitting parts and engaging with a recess of the other fitting part, and
the engagement means being disengageable by a force exceeding a breakaway force predetermined by the engagement means.

12. An inflatable safety belt comprising:
a belt webbing having at least two belt webbing layers on top of each other and forming a hollow space in between,
a gas generator having a flow connection to the hollow space,
an anchor fitting for fastening the belt webbing and the gas generator to a motor vehicle, further comprising that
the belt webbing layers have ends that are connected to the anchor fitting in such a way that the flow connection from the gas generator to the hollow space is free of tensile forces,
that the belt webbing layers wind around at least one clamping element, and
that the clamping element is formed by a pin wound around by the belt webbing layer or the belt webbing layers, the pin forming a bulge and being located in the course of the belt webbing layer in front of a narrow point assigned to the anchor fitting.

* * * * *